United States Patent
Ohue et al.

(10) Patent No.: US 8,233,046 B2
(45) Date of Patent: Jul. 31, 2012

(54) MOUNTING CONSTRUCTION FOR A FACIAL IMAGE PHOTOGRAPHIC CAMERA

(75) Inventors: Kenichi Ohue, Toyota (JP); Masayuki Usami, Nagoya (JP); Shigeyasu Uozumi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1183 days.

(21) Appl. No.: 11/991,383

(22) PCT Filed: Sep. 4, 2006

(86) PCT No.: PCT/IB2006/002421
§ 371 (c)(1), (2), (4) Date: Mar. 3, 2008

(87) PCT Pub. No.: WO2007/029088
PCT Pub. Date: Mar. 15, 2007

(65) Prior Publication Data
US 2009/0115846 A1    May 7, 2009

(30) Foreign Application Priority Data
Sep. 5, 2005    (JP) .................................. 2005-257183

(51) Int. Cl.
*H04N 7/18* (2006.01)
*H04N 5/225* (2006.01)
(52) U.S. Cl. ........................................ 348/148; 348/373
(58) Field of Classification Search ................ 382/115; 396/419; 348/148, 373
See application file for complete search history.

(56) References Cited

U.S. PATENT DOCUMENTS

| 3,515,472 | A  | * | 6/1970  | Schwitzgebel ............... 352/132 |
| 4,625,329 | A  | * | 11/1986 | Ishikawa et al. .............. 382/104 |
| 6,049,747 | A  | * | 4/2000  | Nakajima et al. .............. 701/45 |
| 6,524,020 | B2 | * | 2/2003  | Ellinger et al. ............... 396/419 |
| 2003/0041329 | A1 | * | 2/2003 | Bassett .......................... 725/105 |
| 2004/0011835 | A1 | * | 1/2004 | Kim .............................. 224/312 |
| 2004/0151347 | A1 | * | 8/2004 | Wisniewski .................. 382/115 |
| 2004/0239509 | A1 | * | 12/2004 | Kisacanin et al. ........... 340/575 |
| 2007/0115099 | A1 | * | 5/2007 | Hamada ..................... 340/426.1 |

FOREIGN PATENT DOCUMENTS

| EP | 1 233 390 | 8/2002 |
| EP | 1 332 923 | 8/2003 |

(Continued)

OTHER PUBLICATIONS

International Search Report.

(Continued)

*Primary Examiner* — Firmin Backer
*Assistant Examiner* — Michael A Chambers
(74) *Attorney, Agent, or Firm* — Finnegan, Henderson, Farabow, Garrett & Dunner, LLP

(57) ABSTRACT

A facial image photographic device for vehicle mounting includes a facial image photographic camera which photographs the face of a driver of a vehicle while the vehicle is running, and a changeover device. The changeover device changes over a utilization environment of the facial image photographic camera between a position in which, when performing photography, the facial image photographic camera can be exposed to direct insolation by sunlight, and a position in which, when not performing photography, at least a part of the facial image photographic camera is not to be exposed to direct insolation by sunlight than when performing photography.

13 Claims, 6 Drawing Sheets

FOREIGN PATENT DOCUMENTS

| | | |
|---|---|---|
| FR | 2 837 444 | 9/2003 |
| JP | 06-189306 | 7/1994 |
| JP | 2583335 | 11/1996 |
| JP | 10-960 | 1/1998 |
| JP | 2002-156700 | 5/2002 |
| JP | 2004-145725 | 5/2004 |
| JP | 2004-155265 | 6/2004 |
| JP | 2004-330965 | 11/2004 |
| JP | 2004330965 A * | 11/2004 |
| WO | WO 00/42769 | 7/2000 |

OTHER PUBLICATIONS

Written Opinion of the ISR.

K. Ohue, et al., "Development of a New Pre-crash Safety System," SAE Int'l, *2006 SAE World Congress*, Detroit, Michigan, Apr. 3-6, 2006.

Japanese Office Action dated Apr. 14, 2009.

* cited by examiner

STORAGE POSITION

MOUNTING CONSTRUCTION FOR A FACIAL IMAGE PHOTOGRAPHIC CAMERA

BACKGROUND OF THE INVENTION

1. Field of the Invention

The present invention relates to a mounting construction for a facial image photographic camera, and, more particularly, relates to a mounting construction for a facial image photographic camera which photographs the face of the driver of a vehicle.

2. Description of the Related Art

From the prior art, a construction is per se known in which a camera which photographs the face of a driver of a vehicle is provided within the passenger compartment of the vehicle (for example, see Japanese Patent Application Publication No. JP-A-2004-145725). With such a construction, the camera is mounted upon the column cover of the steering column.

However, with a construction such as the one described above in which the camera is disposed upon the column cover of the steering column, it is possible for a state of affairs to come to pass in which direct sunlight which is incident through the windscreen strikes this camera. Since the temperature of the structural components of the camera is elevated when this situation occurs, in particular when the air conditioner cannot operate because the ignition is OFF, accordingly the inconvenience arises that the functionality of the camera which is made up of electronic components is deteriorated; or, alternatively, the inconvenience arises that it becomes necessary to enhance the heat resistance by designing the camera so as to obtain an enhanced resistance against temperature elevation.

SUMMARY OF THE INVENTION

The present invention takes as its objective to provide a mounting construction for a facial image photographic camera, which prevents the camera, which takes a photograph of the face of the vehicle driver, from attaining a high temperature.

The above described objective is attained by a mounting construction for a facial image photographic camera, in which a camera which photographs the face of a driver of a vehicle is mounted so as to be changed over between a state in which, when performing photography, it can be exposed to direct insolation by sunlight, and a state in which, when not performing photography, the camera is less likely to be exposed to direct insolation by sunlight than when performing photography.

With this aspect of the invention, the camera which photographs the face of the driver of the vehicle is mounted so as to be changed over between a state in which, when performing photography, it can be exposed to direct insolation by sunlight, and a state in which, when not performing photography, the camera is less likely to be exposed to direct insolation by sunlight than when performing photography. Accordingly it is possible to prevent the camera from attaining a high temperature, since, when not performing photography, the camera is less likely to be exposed to direct insolation by sunlight than when performing photography. In this case, with the above described mounting construction for a facial image photographic camera, it would also be acceptable to arrange for the camera to be disposed so as, when not performing photography, to be shifted from a photographic position, in which it can be exposed to direct insolation by sunlight, to a non-photographic position in which the camera is less likely to be exposed to direct insolation by sunlight than when performing photography.

Furthermore, with the above described mounting construction for a facial image photographic camera, it would also be acceptable to arrange for the camera to be arranged upon a column cover of a steering column which, when the ignition is OFF, is stored in a predetermined storage position.

Moreover, the above described objective is attained by a mounting construction for a facial image photographic camera in which a camera which photographs the face of a vehicle driver is disposed upon a column cover of a steering column in a position in which the camera is unlikely to be exposed to direct insolation by sunlight.

According to this aspect of the invention, the camera which photographs the face of the vehicle driver is disposed upon a column cover of a steering column in a position in which the camera is unlikely to be exposed to direct insolation by sunlight. Due to this, it is possible to prevent the camera from attaining a high temperature.

According to the aspects described above, it is possible to prevent a camera, which takes a photograph of the face of the vehicle driver, from attaining a high temperature.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1A:
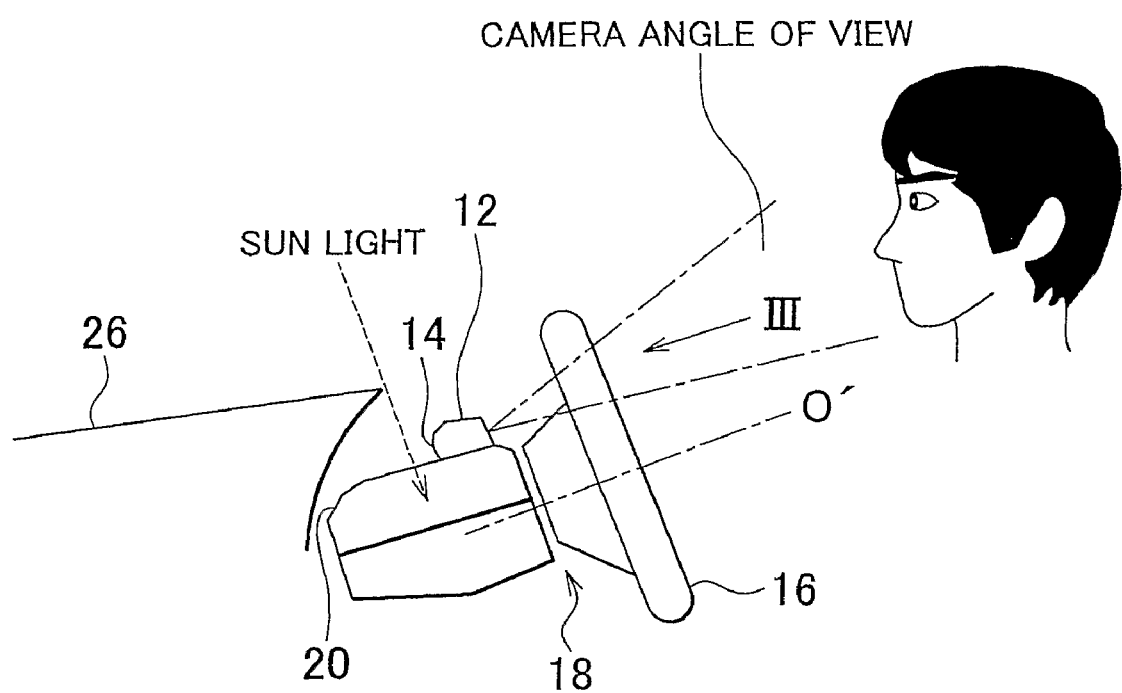
FIG. 1A is a figure showing a mounting construction for a facial image photographic camera according to an embodiment of the present invention, as seen in the direction from the side of the vehicle.
Figure 1B:
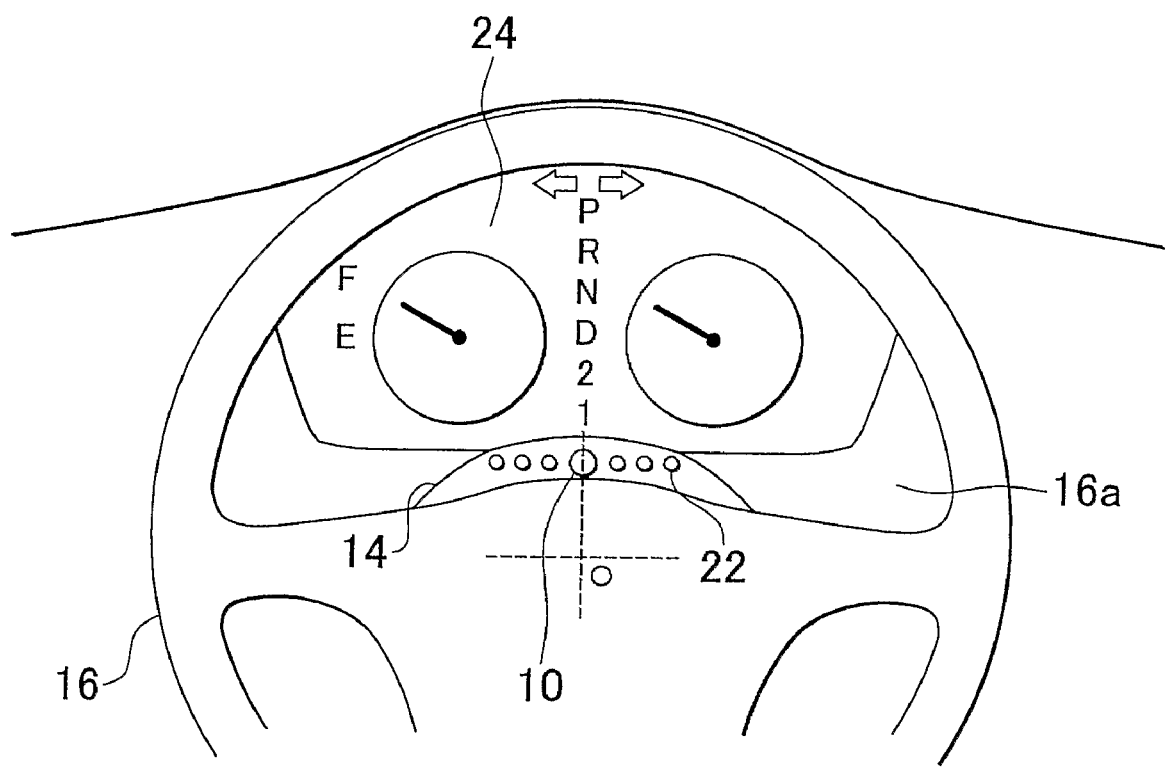
FIG. 1B is a figure showing this mounting construction for a facial image photographic camera according to an embodiment of the present invention, as seen in the direction shown by the arrow III in FIG. 1A.
Figure 2A:
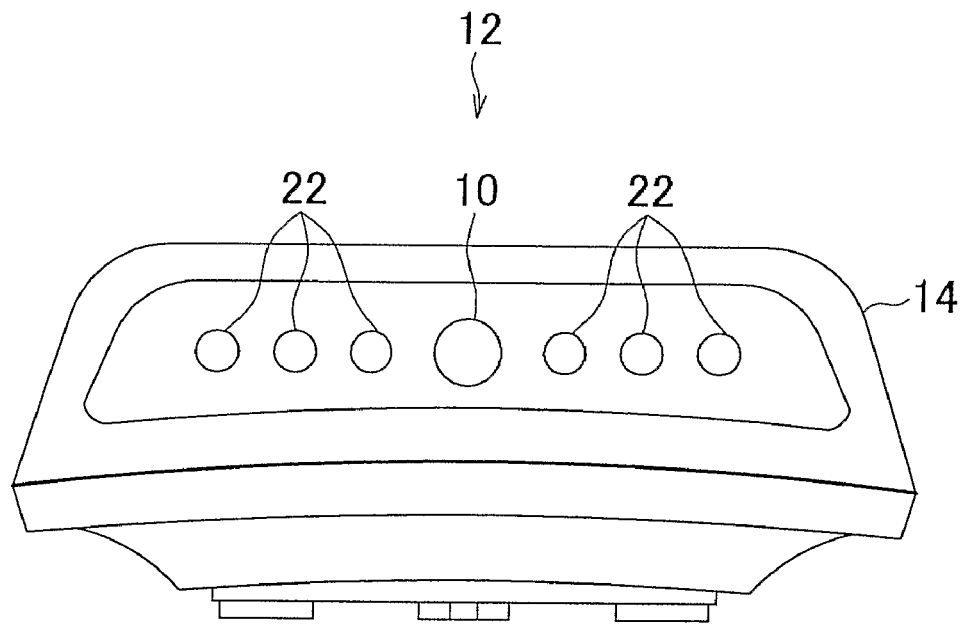
FIG. 2A is an elevation view of a camera assembly which includes a facial image photographic camera according to an embodiment of the present invention.
Figure 2B:
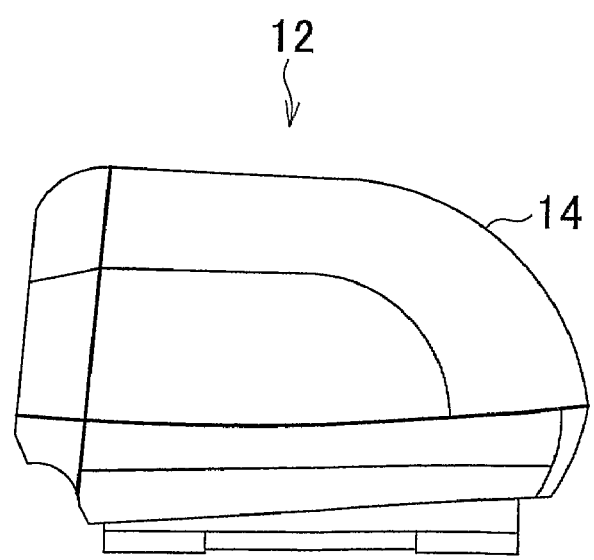
FIG. 2B is a side view of this camera assembly which includes this facial image photographic camera according to an embodiment of the present invention.

FIGS. 1A and 1B show a mounting construction for a facial image photographic camera 10 which is mounted to a vehicle, which is one embodiment of the present invention. It should be understood that in FIG. 1A there is shown a view as seen in the direction from the side of the vehicle, while in FIG. 1B there is shown a view as seen looking in the direction shown by the arrow III in FIG. 1A. Furthermore, FIGS. 2A and 2B show the external appearance of a camera assembly 12 which includes the facial image photographic camera 10 of this embodiment. It should be understood that an elevation view of the camera assembly 12 is shown in FIG. 2A, while a side view of the camera housing 12 is shown in FIG. 12B.

In this embodiment, the facial image photographic camera 10 (hereinafter simply termed the "camera 10") is provided within the passenger compartment of the vehicle in order to detect the line of sight direction of the vehicle driver by photographing the face of that vehicle driver as he sits in the driving seat, and is assembled into the camera assembly 12, which includes the camera 10 and a case 14. This camera assembly 12, as shown in FIG. 1A, is provided upon the upper surface of a column upper cover 20 which covers the shaft portion of a steering column 18 housing a steering wheel 16, which the driver rotationally actuates in the left and right directions when steering. It should be understood that it is desirable for the position in which the camera assembly 12 is located upon the column upper cover 20 to be as close as possible to the side of the steering wheel 16, in order to ensure a sufficient clearance between the camera assembly 12 and a combination meter which will be described hereinafter, which is necessary from the point of view of planning for shock absorption during a collision.

The steering column 18 is integral with the steering wheel 16, and, when the vehicle ignition is ON, it is in a normal steering actuation position so that it is easy for the vehicle driver to perform actuation for driving the vehicle; while on the other hand, when the ignition is OFF, it is stored in a storage position which is more to the side of the engine compartment, i.e. more towards the side of the combination meter, than the above described steering actuation position, so that it is easy for the vehicle driver to get out from the vehicle and moreover it is easy for him to get back into the vehicle again. In other words, the position of the steering column 18 is changed over between the steering actuation position and the storage position, according to whether or not the ignition is being operated by the vehicle driver. The column upper cover 20 at the location at which the camera assembly 12 is mounted is included in the portion of the steering column 18 which can be moved, as described above, between the steering actuation position and the storage position.

As shown in FIG. 2A, the camera 10 and several infra-red floodlights 22 are housed in the case 14 of the camera assembly 12. The camera 10 is mounted in the center of the camera assembly 12, and is positioned upon a vertical axial line which intersects the straight line O' which passes through the center of the steering wheel 16 and is orthogonal to the steering wheel 16. The camera 10 has an angle of view which is directed in a direction facing against the direction of progression of the vehicle, through a opening portion 16a (for example, a fan shaped opening portion) which is opened in the surface of the steering wheel 16 in order for the driver to grip the steering wheel 16 with his hands and moreover in order for the driver to view the combination meter 24, and which moreover is the direction in which the head portion (the face) of the vehicle driver is present, and it photographs the face of the vehicle driver almost square on.

The image signal which has been photographed by the camera 10 is supplied to an electronic control unit. This electronic control unit extracts an image which pictures the face of the vehicle driver by performing binary image processing or feature extraction processing based upon the image signal which is supplied from the camera 10, detects the facial width and the facial center line of the driver from this extracted image, calculates a left/right spacing ratio of the face shown in the image from those parameters, and detects, from this left/right spacing ratio, the direction in which the face of the driver is facing, in other words, the angle thereof from straight ahead (in the following, when the driver is driving in a straight line, his facing angle when his line of sight is directed straight along the vehicle progression direction along its driving lane will be taken as being 0°; this will be termed the "facial orientation angle"). And, according to this facial orientation angle which has thus been detected, the electronic control unit performs processing to provide an alarm, or to change the timing of starting an alarm by changing the threshold value level at which it is deemed that a collision possibility has been arrived at for which an alarm should be provided before colliding with an obstruction in front of this vehicle, such as a vehicle which is present in front of this vehicle or a vehicle coming the other way or a stationary object or the like.

Furthermore, in the camera assembly 12, the same number of infra-red floodlights 22 (in this embodiment, three thereof) are provided upon each of the left and right sides of the camera 10. Each of these infra-red floodlights 22 is a lamp which projects infra-red light towards the head portion of the vehicle driver, and thereby it is made possible for the face of the vehicle driver to be photographed by the camera 10 at night. It should be understood that the reason for the provision of the same number of the infra-red floodlights 22 on both the left and right sides of the camera 10, is that accordingly, when the vehicle driver is facing almost straight on (i.e. is not looking sideways), it is possible to illuminate the face of the driver with infrared light almost equally on its left and right sides; and thereby, even at night, it becomes easy accurately to detect the location of the facial characteristics of the driver, such as his facial width and his facial center line and so on, from the photographic image taken by the camera 10, so that thereby it becomes possible to perform accurate detection of the facial orientation angle of the driver.

Figure 3:
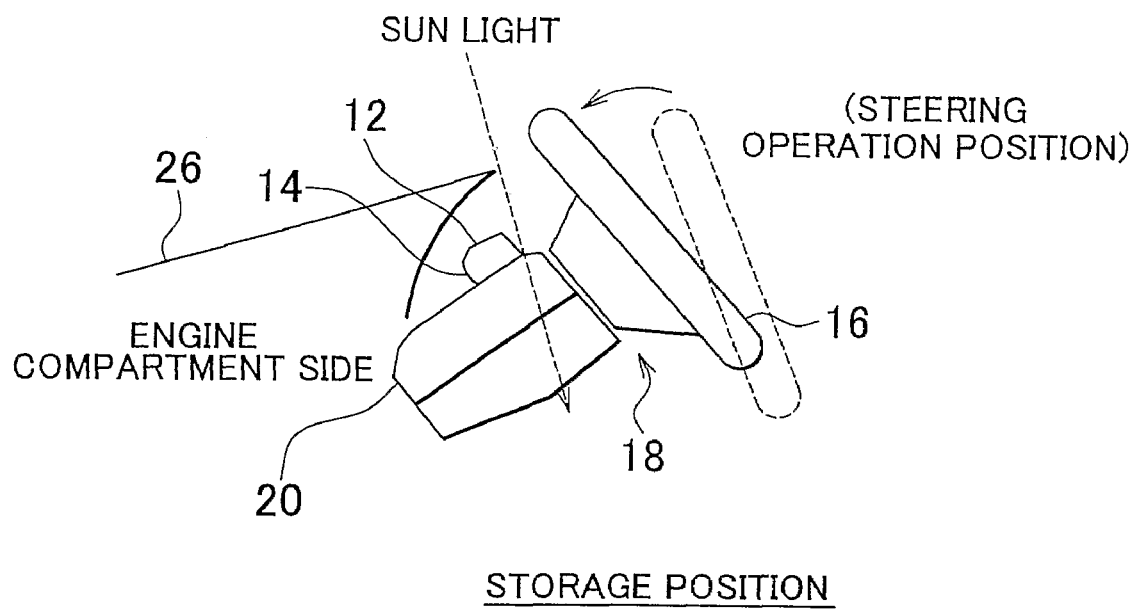
FIG. 3 is a figure for explanation of the distinguishing features of this mounting construction for a facial image photographic camera according to an embodiment of the present invention.

FIG. 3 is a figure for explanation of the specific features of this mounting construction for the facial image photographic camera 10 of this embodiment. Generally, when the ignition of the vehicle is ON and the air conditioner can be operated, it is difficult for the temperature within the-vehicle passenger-compartment to become high, while, when the ignition is OFF and the air conditioner cannot be operated, the temperature within the vehicle passenger compartment can easily become high due to direct insolation by sunlight. Accordingly, when the ignition is OFF and the camera 10, which contains various electronic components, is exposed to direct insolation by sunlight, it is particularly appropriate at this time to prevent the temperature of the camera 10 (and in particular of the various electronic components which are included in the electronic circuits thereof) rising to become high. It should be understood that if the camera assembly 12 is located more towards the engine compartment side of the column cover 20, although the camera 10 is less likely to be exposed to direct insolation by sunlight, on the other hand, with this structure, since no clearance is ensured between the camera assembly 12 and the combination meter 24, there is a danger that it will become difficult to provide a sufficient shock absorbing performance, if a collision occurs when the vehicle is running (when the ignition is ON).

With the construction of this embodiment, as described above, the column upper cover 20 at the location at which the camera assembly 12 is mounted is included in the portion of the steering column 18 which, according to operation of the ignition, can move between the steering operation position and the storage position. The camera assembly 12 is positioned at a location at which, when as shown in FIG. 1A the ignition is ON and the steering column 18 is in its normal steering operating position, at which it must be when the steering is to be operated for driving as when running on the road or the like, then direct sunlight strikes it through the windscreen of the vehicle when the Sun is at its highest angular position (i.e. during its meridian passage). On the other hand, the camera assembly 12 is mounted upon the column upper cover 20 so as to be positioned at a location at which, when as shown in FIG. 3 the ignition is OFF and the steering column 18 is in its storage position in which it is housed more to the side of the engine compartment, then, even when the Sun is at its highest angular position, direct sunlight cannot shine through the windscreen upon the camera assembly 12, due to the shadow of the upper portion of the instrument panel 26 (i.e. the camera assembly 12 is less likely to be exposed to direct insolation than when the ignition is ON).

Although it is necessary for it to become possible for the camera 10 to perform photography when the ignition is turned ON, since the camera 10 is provided in order to perform alarm control by detecting the facial orientation angle of the vehicle of the driver by photographing his face while the vehicle is running, on the other hand, it is not necessary for the camera 10 to perform photography when the ignition is OFF. Thus although, in this embodiment, when the ignition is OFF, it is difficult for the camera 10 to photograph the face of the driver of the vehicle at this time when the vehicle is running, due to the steering column 18 being in its storage position, on the other hand since, when the ignition is ON, the steering column 18 is in its steering operating position, accordingly it is possible for the camera 10 to photograph the face of the driver of the vehicle while the vehicle is running.

Accordingly, in this embodiment of the present invention, by the camera 10 which is assembled into the camera assembly 12 being connected to the movable portion of the steering column 18, when the ignition is ON, a photographic state is established in which it is possible for the camera 10 to photograph the face of the driver of the vehicle, although at this time the camera 10 is in a state in which it is exposed to direct insolation by sunlight. On the other hand, when the ignition is OFF, a non-photographic state is established in which it is not possible for the camera 10 to photograph the face of the driver of the vehicle, and the camera 10 is in a state in which it is not exposed to direct insolation by sunlight. In other words, the camera 10 is changed over between a position in which it can be exposed to direct insolation by sunlight, when the ignition is ON and photography is being performed, and a position in which it cannot be exposed to direct insolation by sunlight, when the ignition is OFF and photography is not being performed. In concrete terms, when the ignition shifts from being OFF to being ON, the photographic state is established, and the camera 10 shifts from its position in which it cannot be exposed to direct insolation by sunlight to its position in which it can thus be exposed; while, conversely, when the ignition shifts from being ON to being OFF, the non-photographic state is established, and the camera 10 shifts from its position in which it can be exposed to direct insolation by sunlight to its position in which it cannot thus be exposed.

In this manner, according to the mounting construction of this embodiment, it is possible to ensure that the camera assembly 12, in other words the camera 10, is not exposed to direct insolation by sunlight when it is not performing photography and the ignition is OFF. Accordingly it becomes possible to prevent the camera 10 from attaining a high temperature, as compared to a structure of a type in which the camera 10 is exposed to direct insolation by sunlight when the ignition is OFF, in which case it is easy for the temperature within the vehicle passenger compartment to become very high, due to such direct insolation by sunlight. Due to this, it is possible to prevent elevation of the temperature of the structural components of the camera 10 (and in particular of the electronic components thereof, including its electronic circuits) to the greatest possible extent; and, thereby, it is possible to prevent deterioration of the functionality of photography, and it is not necessary to provide the camera 10 with high degree of heat resistance.

Furthermore, according to the mounting construction of this embodiment, while, on the one hand, when the ignition is ON, the situation is such that it is possible for the camera assembly 12 to be exposed to direct insolation by sunlight, since a sufficient clearance is ensured between this camera assembly 12 and the combination meter 24, accordingly it is possible when the vehicle undergoes a collision while it is running, to perform shock absorption in an efficient manner.

Furthermore, with this embodiment of the present invention, the infra-red floodlights 22 as well, just like the camera 10, attain a state when the ignition is ON in which they can be exposed to direct insolation by sunlight, while on the other hand, when the ignition is OFF, they attain a state in which they cannot be exposed to direct insolation by sunlight. In concrete terms, when the ignition is turned from OFF to ON, the floodlights 22 are positionally shifted from their position in which they cannot be exposed to direct insolation by sunlight, to their position in which sunlight can shine upon them; while, conversely, when the ignition is turned from ON to OFF, the floodlights 22 are positionally shifted from their position in which they can be exposed to direct insolation by sunlight, to their position in which sunlight cannot shine upon them. Thus, according to the mounting construction of this embodiment of the present invention, it is possible to ensure that, when the ignition is OFF and photography is not being performed, the infra-red floodlights 22, which are accessories to the camera 10, are not exposed to direct insolation by sunlight. Accordingly, it becomes possible to prevent the infra-red floodlights 22 from attaining a high temperature, as compared to a structure in which when the ignition is OFF the infra-red floodlights 22 are exposed to direct. insolation by sunlight, when it is easy for the temperature within the vehicle passenger compartment to become high due to direct insolation by sunlight. Because of this, it is possible to prevent elevation of the temperature of the various structural components of the infra-red floodlights 22 (and in particular of the electronic components thereof, including their electronic circuitry) to the greatest possible extent, so that thereby it is possible to prevent deterioration of the functionality of photography, and it is not necessary to provide the infra-red floodlights 22 with high degree of heat resistance.

It should be understood that, with the above described embodiment of the present invention, the facial image photographic camera 10 is one example of the "camera" described in the range of the Patent Claims; the column upper cover 20 is one example of the "column cover" described in the range of the Patent Claims; and the storage position in which the steering column 18 is stored more towards the side of the engine compartment than the steering operating position, in order to make it easy for the vehicle driver to get into and get out of the vehicle, is one example of the "predetermined storage position" described in the range of the Patent Claims.

By the way, although, with the above described embodiment of the present invention, the camera 10 is one which is provided in order to detect the facial orientation angle of the driver of the vehicle, this should not be considered as being limitative of the present invention; it would also be acceptable to arrange to provide a camera in order to detect the movement of the eyes or the movement of the head of the driver of the vehicle, or to detect his facial expression or the like.

Furthermore although, with the above describe embodiment of the present invention, it was arranged to provide the camera assembly 12 in which both the camera 10 and the infra-red floodlights 22 were stored within the case 14, it would also be acceptable to arrange to provide the camera 10 and the infra-red floodlights 22 separately from one another. In this case, it would become necessary to provide a structure which was capable of ensuring that both of the camera 10 and the infra-red floodlights 22 (and in particular the electronic components thereof, including their electronic circuitry) was not exposed to direct insolation by sunlight.

Furthermore although, with the above described embodiment of the present invention, the camera assembly 12 is provided upon the column upper cover 20, which is a movable portion of the steering column 18 which can be moved to a steering operating position and a storage position, in order to implement changing over between a state in which exposure of the camera 10 and the infra-red floodlights 22 to direct insolation by sunlight is possible and a state in which such exposure is not possible, and it was arranged to shift the position of the camera 10 and so on to a photographic position in which exposure to direct insolation by sunlight is possible and a non-photographic position in which such exposure is not possible, alternatively, it would also be acceptable to arrange to provide a dedicated mechanism for shifting the position of the camera assembly 12, and to shift the position of the camera 10 and so on with this mechanism between a photographic position in which exposure to direct insolation by sunlight is possible and a non-photographic position in which such exposure is not possible. It should be understood that such a structure could also be applied to a system in which the steering column 18 is not movable between a steering operating position and a storage position.

Furthermore although, with the above described embodiment of the present invention, the camera assembly 12 is provided upon the column upper cover 20, which is a movable portion of the steering column 18 which can be moved to a steering operating position and a storage position, in order to implement changing over between a state in which exposure of the camera 10 and the infra-red floodlights 22 to direct insolation by sunlight is possible and a state in which such exposure is not possible, and it was arranged to shift the position of the camera 10 and so on to a photographic position in which exposure to direct insolation by sunlight is possible and a non-photographic position in which such exposure is not possible, this is not to be considered as being limitative of the present invention; conversely, it would also be acceptable to arrange for the camera 10 and so on not to be positionally shiftable but to be fixed, and to implement changing over of the camera 10 and so on between a state in which exposure thereof to direct insolation by sunlight is possible and a state in which such exposure is not possible, by shifting the position of the upper portion of the instrument panel 26 by projecting it outwards and pulling it inwards. It should be understood that such a structure could also be applied to a system in which the steering column 18 is not movable between a steering operating position and a storage position.

Furthermore although, with the above described embodiment of the present invention, it was arranged to change over the camera 10 and the infra-red floodlights 22 between a state in which they can be exposed to direct insolation by sunlight and a state in which they cannot be thus exposed, according to actuation of the ignition of the vehicle, this is not to be considered as being limitative of the present invention; it would also be acceptable to arrange to implement this changing over according to the actuation of a dedicated switch, or according to manual actuation.

Figure 4:
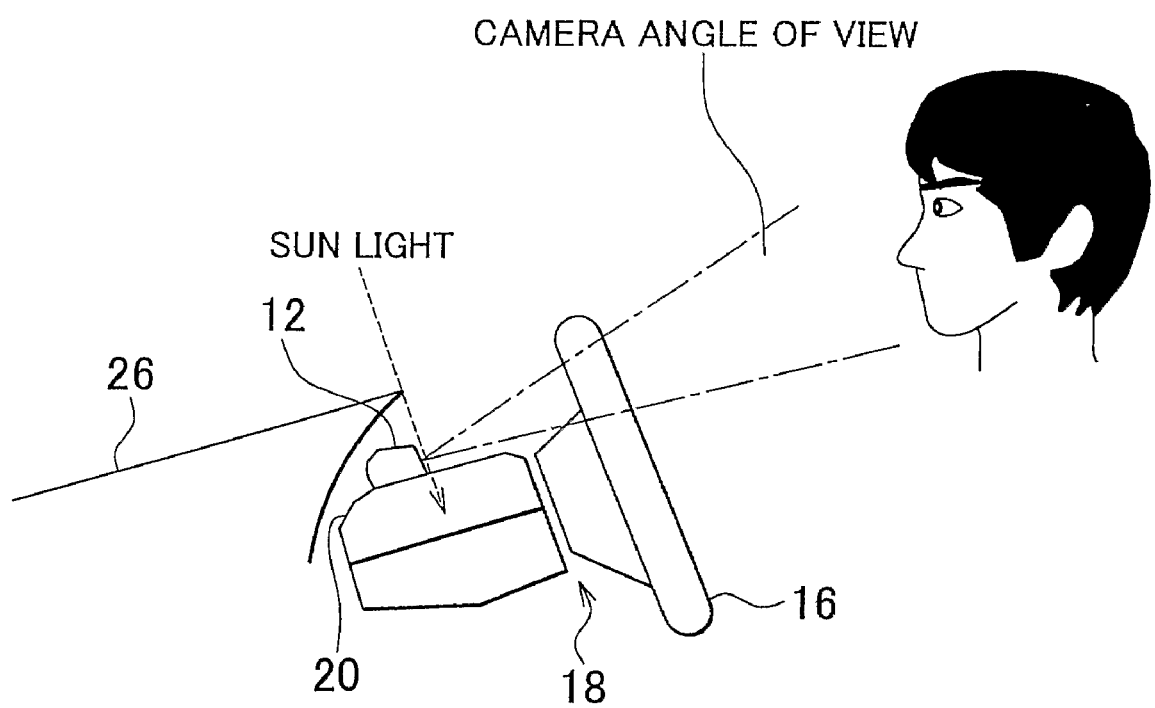
FIG. 4 is a view showing a mounting construction for a facial image photographic camera according to an embodiment of the present invention.
Figure 5:
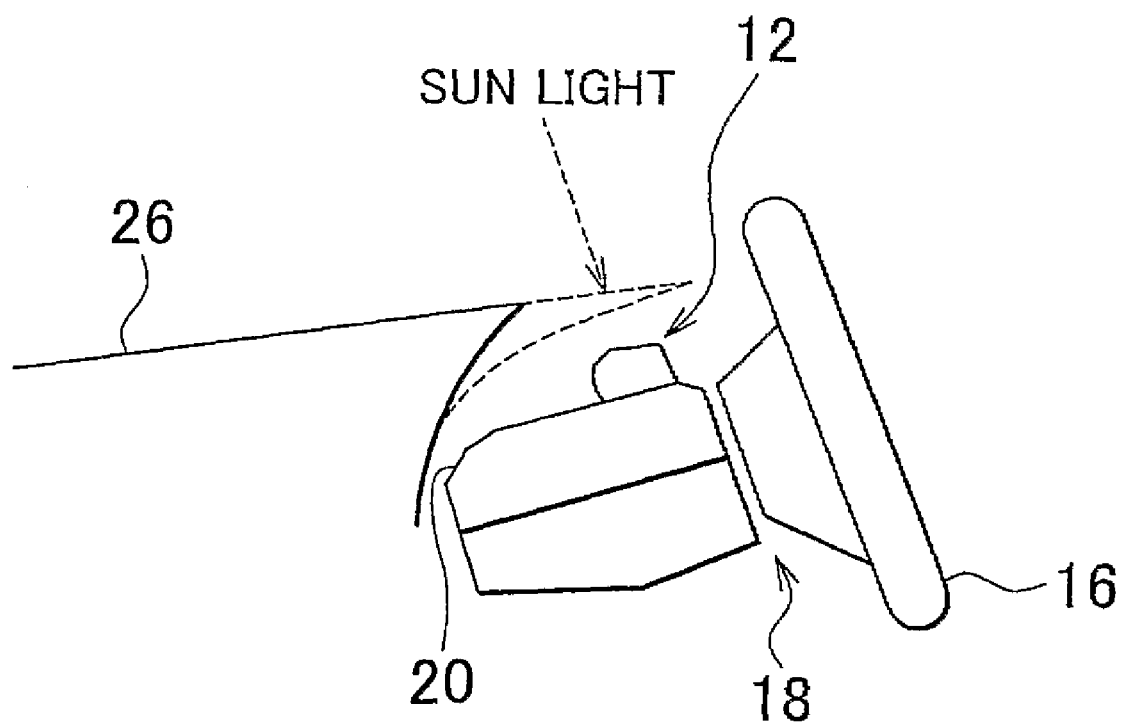
FIG. 5 is a view showing a mounting construction for a facial image photographic camera according to an embodiment of the present invention.

Moreover although, with the above described embodiment of the present invention, the camera 10 and the infra-red floodlights 22 are mounted on the steering side of the column upper cover 20 of the steering column 18, and it is arranged to change them over between a state in which they can be exposed to direct insolation by sunlight and a state in which they cannot be thus exposed, alternatively, as shown in FIG. 4, it would also be acceptable to arrange to position the camera 10 and the infra-red floodlights 22 at a position on the engine compartment side of the column upper cover 20 in which they cannot be exposed to direct insolation by sunlight. Since, with such a structure, it is possible to ensure that the camera 10 and so on are not exposed to direct insolation by sunlight even when the steering column 18 is in the steering operating position, accordingly it becomes possible yet further to prevent the camera 10 from attaining a high temperature. It should be understood that such a structure could also be applied to a system in which the steering column 18 is not movable between a steering operating position and a storage position.

The invention claimed is:

1. A mounting construction, comprising:
a facial image photographic camera assembly including a facial image photographic camera, wherein the facial image photographic camera assembly is disposed in a vehicle, the vehicle comprising an instrument panel, wherein
the facial image photographic camera is configured to photograph the face of a driver of the vehicle while the vehicle is running, the facial image photographic camera assembly being configured to be changed over between a position in which, when performing photography, the facial image photographic camera can be exposed to direct insolation by sunlight, and a position in which, when not performing photography, at least a part of the facial image photographic camera is not exposed to direct insolation by sunlight due to a shadow of an upper portion of the instrument panel of the vehicle.

2. A mounting construction according to claim 1, wherein the facial image photographic camera is disposed so as, when not performing photography, to be shifted from a photographic position in which the facial image photographic camera can be exposed to direct insolation by sunlight, to a non-photographic position in which at least the part of the facial image photographic camera is not exposed to direct insolation by sunlight.

3. A mounting construction according to 1, wherein the facial image photographic camera is mounted upon a column cover of a steering column of the vehicle, wherein when an ignition of the vehicle is in an OFF position, the steering column is stored in a predetermined storage position.

4. A facial image photographic device for vehicle mounting, comprising:
a facial image photographic camera, wherein the facial image photographic camera is disposed in a vehicle, the vehicle comprising an instrument panel, wherein the facial image photographic camera is configured to photograph a face of a driver of the vehicle while the vehicle is running, and
a changeover device configured to change over a utilization environment of the facial image photographic camera between a position in which, when performing photography, the facial image photographic camera can be exposed to direct insolation by sunlight, and a position in which, when not performing photography, at least a part of the facial image photographic camera is not exposed to direct insolation by sunlight due to a shadow of an upper portion of the instrument panel of the vehicle.

5. A facial image photographic device for vehicle mounting according to claim 4, wherein
the changeover device shifts a position of the facial image photographic camera between the position in which, when performing photography, the facial image photographic camera can be exposed to direct insolation by sunlight, and the position in which, when not performing photography, at least the part of the facial image photographic camera is not exposed to direct insolation by sunlight.

6. A facial image photographic device for vehicle mounting according to claim 4, wherein when an ignition is ON, photography is being performed and, when an ignition is OFF, photography is not being performed.

7. A facial image photographic device for vehicle mounting according to claim 4, wherein when not performing photography, the facial image photographic camera is not to be exposed to direct insolation by sunlight through a windscreen of the vehicle.

8. A facial image photographic device for vehicle mounting according to claim 4, wherein
the facial image photographic camera is connected to a movable portion of a steering column of the vehicle, and when the facial image photographic camera is changed over between the positions, the facial image photographic camera remains connected to the movable portion of the steering column.

9. A facial image photographic device for vehicle mounting according to claim 4, wherein
the facial image photographic camera is arranged upon a column cover of a steering column so that the camera is in the shadow of the instrument panel of the vehicle when the steering column is stored in a predetermined stored position.

10. A mounting construction comprising:
a facial image photographic camera assembly including a facial image photographic camera; and
a shield member; wherein
the mounting construction is disposed in a vehicle, the vehicle comprising an instrument panel and a steering column having a column cover,
the shield member is disposed at an upper portion of the instrument panel and the facial image photographic camera is disposed upon the column cover of the steering column in a position in which at least a part of the camera is not exposed to direct insolation by sunlight due to a shadow of the shield member, the facial image photographic camera being configured to photograph a face of a driver of the vehicle while the vehicle is running.

11. A mounting construction according to claim 10, wherein
the shield member intercepts direct insolation of sunlight which the column cover receives.

12. A mounting construction according to claim 11, wherein
the shield member is a projection of the instrument panel upper portion, and the facial image photographic camera is disposed upon the column cover at a portion which is in the shadow of the projection.

13. A mounting construction, comprising:
a facial image photographic camera assembly including a facial image photographic camera; and
a shield member configured to place the facial image photographic camera, when not performing photography, into a state in which at least a part of the facial image photographic camera is not exposed to direct insolation by sunlight,
wherein the shield member is configured to be placed in a storage position during photography, and, when not performing photography, the shield member is configured to be projected into a position in which the facial image photographic camera is not exposed to direct sunlight.

* * * * *